March 28, 1967 C. E. MENDEZ 3,311,269
ALL-PURPOSE COMMODITY PNEUMATIC TRAILER
Filed Nov. 30, 1965 3 Sheets-Sheet 1
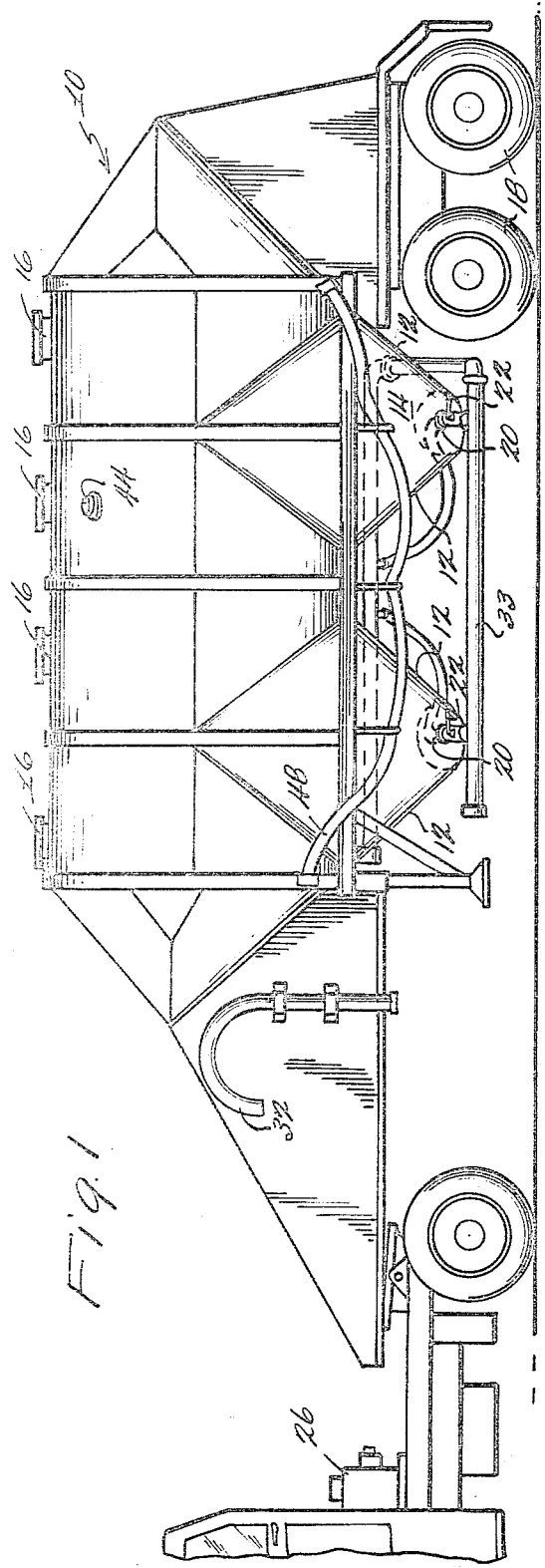
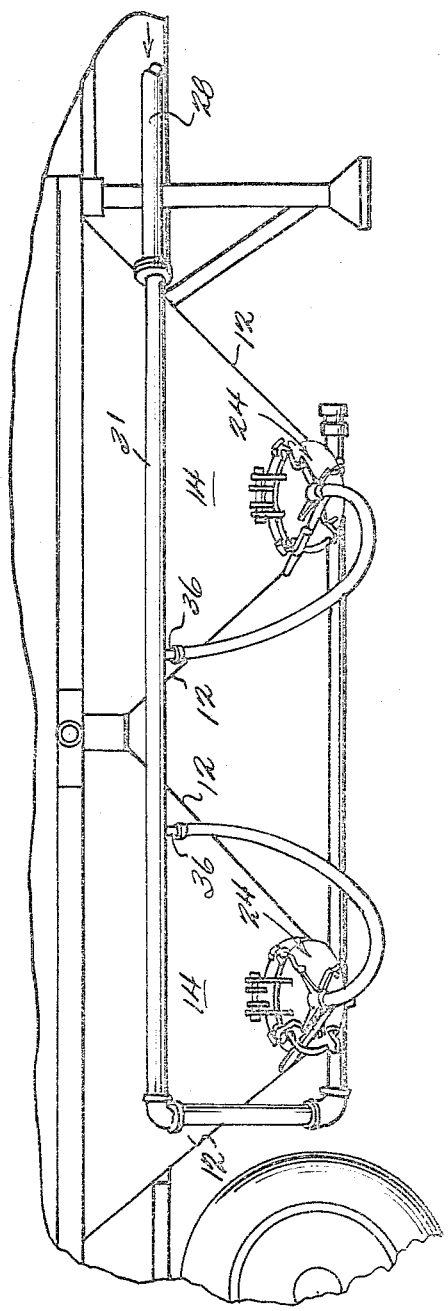
INVENTOR
CHARLES E. MENDEZ
BY Cushman Darby & Cushman
ATTORNEYS

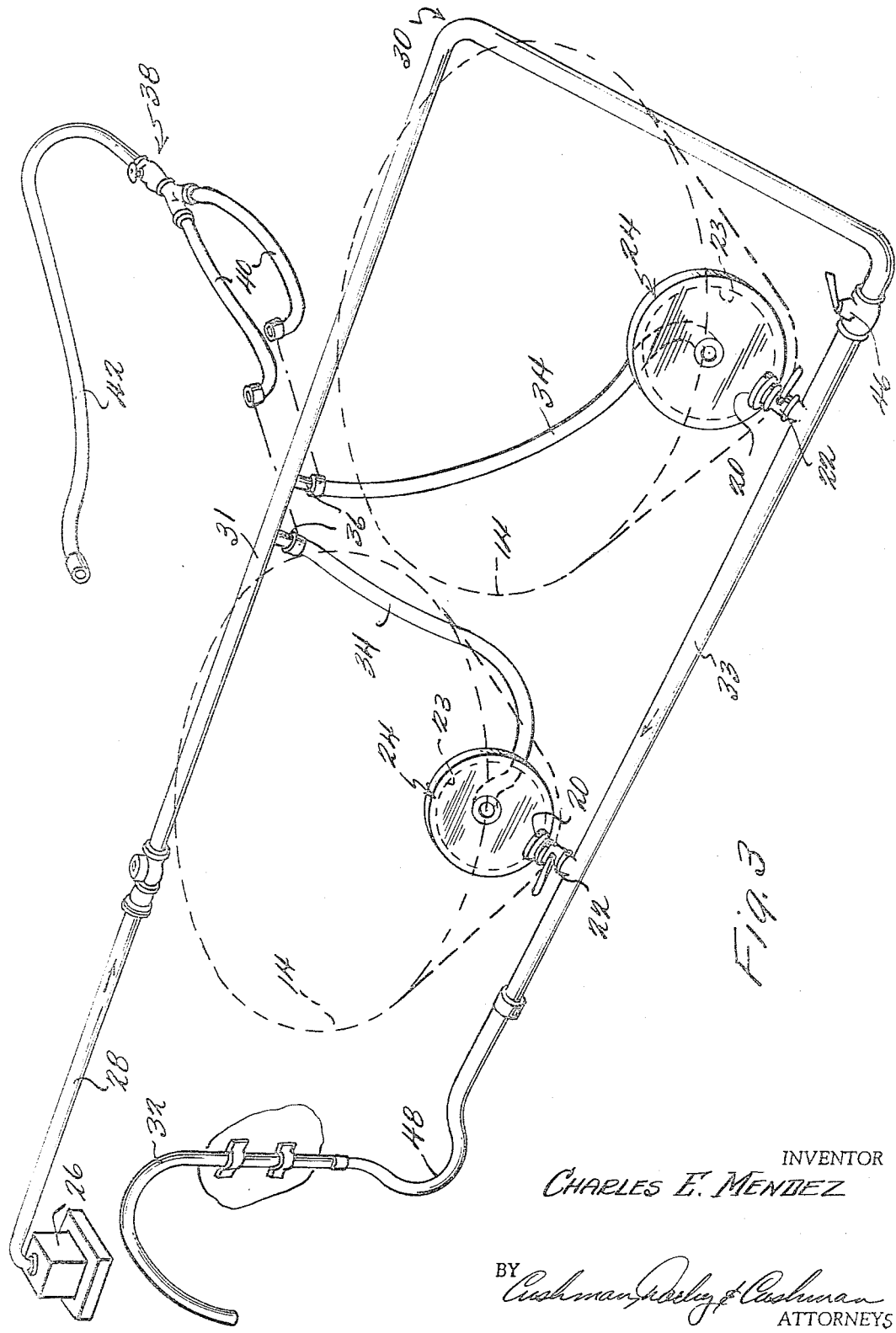

INVENTOR
CHARLES E. MENDEZ

BY
*Cushman Darby & Cushman*
ATTORNEYS

United States Patent Office 3,311,269
Patented Mar. 28, 1967

3,311,269
ALL-PURPOSE COMMODITY PNEUMATIC TRAILER
Charles E. Mendez, P.O. Box 426, Tampa, Fla. 33601
Filed Nov. 30, 1965, Ser. No. 510,589
10 Claims. (Cl. 222—176)

This invention relates to apparatus for transporting and discharging bulk materials, and particularly to vehicles having pneumatic discharge means and which can be readily converted to carry and discharge non-pulverulent dry materials and liquids as well as pulverulent dry materials.

Pneumatic discharge systems for use with storage bins and mobile storage containers are generally well known in the art, and such systems conventionally provide a means for fluidizing the interior of the container for discharging the dry material contents therefrom. The known fluidizing devices are complex in their construction and require costly modification of existing bins or trailers to accommodate the fluidizing apparatus. Once installed, the storage bin or trailer is necessarily limited in its use to the storage and discharge of only dry pulverulent materials, and in the case of trailer units this works a costly limitation on the hauling versatility of the unit.

The present invention provides for an improved construction for storing and hauling a variety of materials and for discharging the same from the storage vehicle. In its illustrative embodiment, the invention is directed to trailer vehicles which are constructed to haul and discharge solid or liquid materials, and the solid materials may be either pulverulent or non-pulverulent in form. The trailer vehicle of this invention is quickly and easily converted to handle a variety of materials, and all of the materials are easily discharged from the vehicle upon reaching a delivery point.

The trailer vehicle of this invention is constructed to include one or more hopper compartments for storing the material while it is being hauled from one place to another. The hoppers have sloping bottoms which are substantially in the form of cones having their narrowest portions at the bottoms of the hoppers. A first discharge outlet is provided on one side of the hopper bottom for discharging finely pulverized material which is fluidized and discharged by pneumatic discharge means. Also, the first discharge outlet functions to discharge liquids from the trailer bin, when liquids are hauled by the trailer. A second discharge outlet is provided on an opposite bottom wall of the hopper for discharging non-pulverulent material which is coarser and which cannot be discharged pneumatically. The second discharge outlet is in the form of an enlarged door which can be opened to allow non-pulverulent material to be dumped from the hopper by gravity. The door functions as a sealing means and also as a fluidizing means. For the latter function the door is provided with an orifice which can be connected to a pneumatic system for admitting air under pressure into the interior of the hopper and for fluidizing any pulverulent material contained therein. The door which forms the second discharge outlet is of such a size that a man can enter the hopper through its bottom when the door is opened, and this feature permits an easy access into the interior of the hopper for cleaning and maintenance purposes.

The door is also constructed to admit and diffuse air under pressure into a large area of the hopper in the region adjacent to the pulverulent material discharge opening. This construction provides for a better fluidizing and pneumatic conveying of pulverulent material than has been provided in prior devices. Furthermore, the fluidizing apparatus of this invention is more easily inspected and maintained than in prior devices, because the entire fluidizing section of the hopper is accessible by merely opening the door so as to expose the elements which make up the fluidizing section on the interior of the door.

Alternatively, the door can be easily sealed with a gasket means which seals the hopper for a hauling of liquids. When liquids are to be discharged, the pneumatic system of the trailer is adjusted to admit air under pressure into the trailer compartments above the level of the liquid so as to assist in the quick discharge of liquid from the trailer. Liquids are discharged from the pulverulent material outlets, or alternative outlets may be provided for the discharge of liquids loads from the trailer.

The pneumatic discharge apparatus associated with the trailer includes a compressor means for providing air under pressure, and connecting hoses and valves are provided for admitting air pressure to either the bottom of the hopper or to its top, depending upon the nature of material being handled. A discharge pipe for pulverulent material is mounted in communication with the first discharge outlet of the hopper for conveying pulverulent material away from the hopper and from the trailer unit. Further, the discharge pipe is pivotally mounted so that it can be swung to a desired position with its outlet emptying into a bin or another vehicle adjacent to the trailer unit of this invention. Another feature of the pneumatic discharge system resides in a particular flow arrangement for the air under pressure wherein a part of the air stream is utilized for fluidizing the contents of the trailer while the remainder of the air stream is utilized to provide an entraining action adjacent the pulverulent material outlets, thus increasing the discharging capacity and rate of the system.

With the apparatus of this invention it is possible for a single trailer unit to be adapted to a variety of hauling requirements. For example, a pulverulent material such as a super phosphate fertilizer can be hauled in a first direction and pneumatically discharged at the delivery point. Then, the trailer can be used on the return trip to pick up a load of phosphate rock for delivery to a processing plant, and the non-pulverulent phosphate rock can be discharged by gravity through the hopper doors at that delivery point. At any time that it becomes necessary or economical, the trailer can be quickly sealed for carrying liquids and for discharging the same without costly modification of the unit or damage to the fluidizing apparatus associated with it.

These and other features and advantages of the present invention will become apparent in the more detailed discussion below, and in that discussion reference will be made to the accompanying drawings in which:

FIGURE 1 is a vertical plan view of a truck trailer embodying the present invention;

FIGURE 2 is a detailed vertical plan view of an opposite side of the truck trailer shown in FIGURE 1, and illustrating structure associated with the hoppers of the trailer;

FIGURE 3 is a perspective view of a pneumatic system which forms a part of the present invention;

Figure 4:
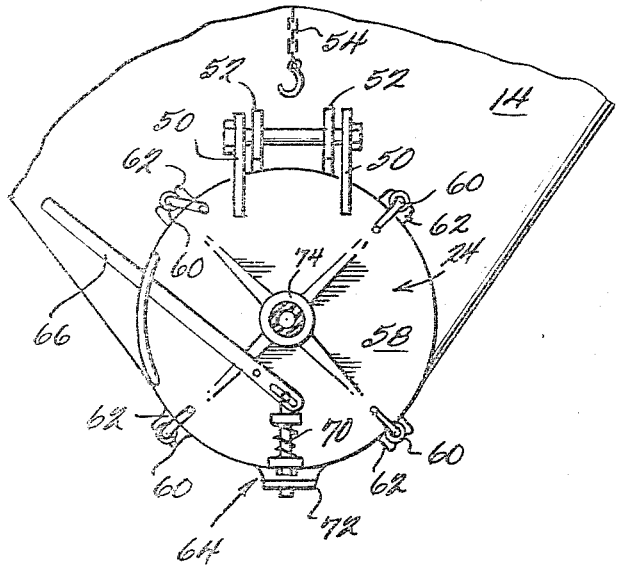
FIGURE 4 is a detailed plan view of a door structure associated with the bottom of a hopper.

Referring to FIGURES 1 and 2, the apparatus of this invention is illustrated in the form of a truck trailer 10 which is essentially barrel shaped and which includes wall portions to define a storage bin area for material contained within the barrel shaped structure. Bottom walls 12 of the trailer storage area slope downwardly and toward one another to define separate hoppers or compartments 14. Although the trailer is illustrated as having two hoppers 14, it to be understood that a trailer may be constructed with one hopper, or any other desired number of hoppers, in a single vehicle. The sloping walls 12, together with curved surfaces which are provided on the interior of the trailer bin, provide for an easy flow or movement of material contained therein to the bottom portions of the individual hoppers 14. The trailer bin is further provided with access ports 16 at its top for admitting material into the bin, and the entire structure is mounted on wheels 18 in any conventional manner so that the entire trailer can be attached to a truck and hauled from place to place.

The lowermost portions of the hoppers 14 are provided with two types of discharge outlets for discharging different types of materials which may be contained within the storage bin of the trailer. A first discharge outlet 20 leads from one side wall of each hopper near the bottom portion of the hopper, and the first discharge outlet 20 provides for a removal of liquids or fluidized pulverulent dry material from the trailer. Liquids are discharged through the openings 20 by opening valving devices 22 associated with each outlet and by applying a fluid pressure to the top of the storage bin, in a manner which will be described below. Fluidized dry material is likewise discharged through the outlets 20 when the valves 22 are opened and a separate fluidizing means is provided for admitting a pressurized gas into the hopper for effecting a fluidization of dry material contained therein.

Fluidized material, as used in this specification, refers to finely pulverized dry material which can be agitated by the addition of a gas under pressure so as to reduce the frictional contact between separate particles of the pulverulent material. When such material is in a fluidized state, it flows more readily from one place to another, and is more easily discharged than when it is in a compacted unfluidized state. The fluidization may be effected by the addition of air under pressure into the material, but other gases may also be used to accomplish the same result.

Looking to FIGURE 2, a second type of discharge outlet 23 is illustrated as being covered by doors 24. The doors 24 are hinged against outside walls of the separate hoppers 14 so that they can be swung toward and away from the second discharge openings contained through side wall portions of the hopper. The doors 24 function as sealing devices for closing the second discharge outlets associated with each hopper, and also the doors 24 include fluidizing means for admitting gas under pressure into the hoppers 14. The first and second discharge openings of each hopper are arranged in opposed relationship to one another and on opposite sloping walls of an individual hopper so that the admission of air through the fluidizing means of the doors will be directed toward the opposite discharge outlets which function to discharge fluidized material out of the individual hoppers. The second discharge outlets are larger in diameter than the first discharge outlets and the second outlets are illustrated as being of a sufficient size to function as outlets for relatively large granular or bulk material which may be contained within the trailer bin. The second discharge outlets provide for a gravity discharge of heavy materials which cannot be fluidized, and this feature permits the trailer of this invention to be used for a variety of materials. Furthermore, the second discharge outlets are of such diameters that they provide an easy access into the hoppers 14 for cleaning and maintenance purposes. In the preferred form of this invention, the second discharge outlets have diameters which are large enough for a man to enter the hoppers 14 for sweeping or cleaning down the interiors of the hopper structures.

The pneumatic system which provides for the fluidization and discharge of pulverulent materials from the trailer is illustrated in FIGURE 3. This figure also shows in phantom lines the relative positions of two hoppers in association with a preferred flow arrangement for the pneumatic system. The pneumatic system provides for a flow of air, or other gas, under pressure and into selected portions of the trailer bin. When the system is utilized for discharging dry pulverulent material, the air flow is directed through the doors 24 and into the bottom portions of the separate hoppers 14. On the other hand, when the system is utilized for discharging a liquid from the trailer bin, the flow of air is directed into an upper portion of the trailer bin and above the liquid contained therein.

In the illustrated embodiment of the pneumatic discharge system, a source of air under pressure is provided by the compressor means 26. The compressor may be mounted on the trailer or on the truck, and is shown as being carried by the truck. A connecting hose 28 is normally carried in a stored position on the body of the trailer until it is desired to discharge material from the trailer. At that time, the flexible hose 28 is interconnected between the compressor means 26 and an air conduit line 30 which is carried in a fixed position relative to the trailer body and the hoppers contained in the trailer. The air conduit line 30 is constructed to provide a flow path on both sides of the trailer 10, and is shown as a generally U-shaped conduit which is affixed to a lower part of the trailer vehicle so as to provide a flow line on opposite sides of the hoppers 14. One the curb side of the trailer vehicle, a high pressure leg 31 of air conduit 30 passes by the large second discharge outlets which are associated with each of the hoppers 14. On the street side of the trailer vehicle a discharge leg 33 of the air conduit line 30 passes by and communicates with each of the first discharge outlets 20 so as to entrain any material discharging from those outlets for carrying such material to a dispensing pipe 32. For fluidizing the contents of the trailer, the air conduit line 30 is connected to the doors 24 through removable conduits 34. The conduits 34 communicate with the high pressure side 31 of the air line 30, and high pressure air is thus conveyed through the doors 24 and into fluidizing devices which will be described in greater detail later. The conduits 34 are removable from the air line 31 at the connecting points 36, and when the conduits 34 are removed a separate adapter conduit device 38 in the form of a "Y" can be connected to the high pressure side of the air line at the points 36. The Y-shaped adapter 38 provides for a diverting of high pressure air from the air line 31 into an upper portion of the trailer bin for applying a pressure above a liquid contained within the bin. Y-branches 40 of the adapter 38 are connected to the points 36 of the air line 30, and the hose 42 conducts air pressure from the Y-branches 40 and into an upper part of the storage bin through a suitable opening 44 contained within the trailer tank (FIGURE 1).

The air conduit 30 is further provided with a control valve 46 which regulates the amount of positive pressure which can be built up on the high pressure side of the system. The valve 46 also permits a controlled leakage of some of the high pressure air into the discharge side of the pneumatic system, and this feature is important for providing an entraining air stream which assists in the discharge of materials from the first discharge outlets 20. When the valves 22 are operated to open the first discharge outlets 20, a pressure can be applied to the contents of the trailer bin to move material out of the first discharge outlets 20. The pressure can be applied through either the conduit 34 or through the adapter 38, and a regulation of the valve 46 determines the amount of pressure which is admitted to the interior of the trailer bin as related to the entraining pressure of air moving past the first discharge outlets 20 in the leg 33 of the air conduit system 30. By a manipulation of the valve 46, more or less positive pressure can be admitted to the interior of the trailer bin, and more or less air flow can be permitted to move past the discharge outlets 20 for assisting in the dispensing of material through those outlets. The dispensing pipe 32 is normally carried in a stored position on the body of the trailer, as shown in FIGURE 1, and this pipe is interconnected to the discharge line 33 by a flexible connecting hose 48. The dispensing pipe 32 is mounted so that it can be turned at various angles for dispensing into a container or into another vehicle which is positioned alongside of the trailer 10. Additionally, flexible conduit devices can be added to the dispensing pipe 32 for conveying discharge material for desired distances away from the trailer 10.

Figure 5:
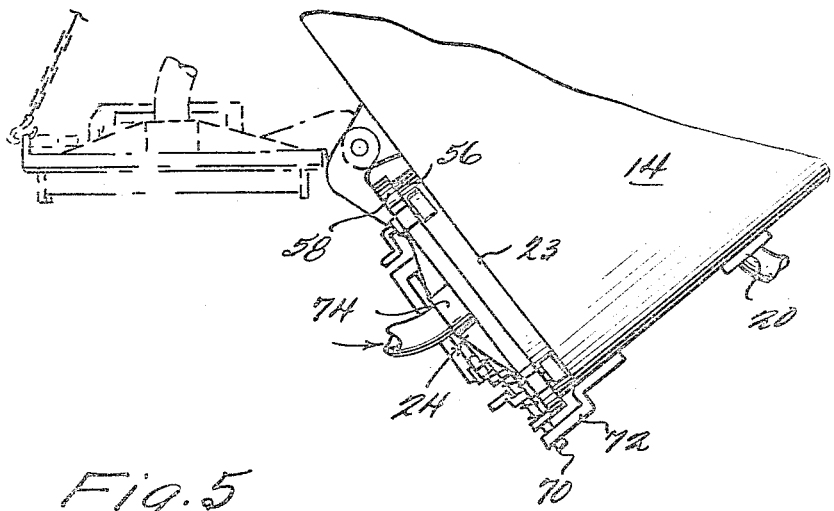
FIGURE 5 is a side view of the FIGURE 4 door structure.
Figure 6:
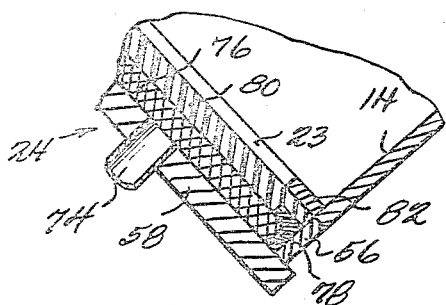
FIGURE 6 is a detailed cross sectional view of the door shown in FIGURE 5.

FIGURES 4, 5 and 6 illustrate details of the door structure and fluidizing means associated with each of the second discharge outlets 23 for each hopper. FIGURE 4 shows a plan view of the door 24 as seen from the curb side of the hopper upon which the door is mounted. A mounting means 50 is attached to the door for pivotally hinging the door to brackets 52 carried by an outside wall of the hopper 14. The door is mounted to swing outwardly away from the second discharge opening and upwardly to a position as illustrated by the dotted lines shown in FIGURE 5. A chain and hook means 54 is provided for attachment to an outer portion of the raised door so as to retain the door in an open position when the hopper 14 is being dumped or cleaned. The door closes the second discharge opening 23 by engaging a mounting ring 56 which surrounds the opening through the hopper wall. When the door is in a closed position as illustrated in FIGURE 5, portions of the door interior fill the space within the confines of the mounting ring 56, and an outer plate 58 of the door abuts an outer edge of the mounting ring 56. Locking devices are provided around the perimeter of the door for tightly locking the door into sealing engagement with the mounting ring 56. Latches 60 are mounted at spaced points around the door perimeter to engage and tighten projecting members 62, which are rigidly affixed to the mounting plate 58. A further latching mechanism 64 is provided for holding the door into a closed position until all of the latches 60 can be released. Once the latches 60 are released by manually turning them and swinging them away from the projecting members 62, the door is still held in a locked and closed position by the latching member 64. This permits an operator to move to one side of the door before it is finally released for dumping contents from the hopper. An operator can release the latching mechanism 64 by applying a pressure to lever 66 which is pivoted at 68. One end of the lever is connected to a sliding lock 70 which is moved out of locking engagement with a bracket 72 carried by a portion of the hopper structure adjacent to the door 24 when the lever 66 is moved downwardly from the position shown in FIGURE 4. Thus, there is provided a safety latching means which permits the door to be partially unlocked before it is finally released for dumping the contents of the hopper 14.

FIGURE 6 illustrates a cross-sectional detail of the fluidizing means carried by each of the doors 24. An inlet member 74 is mounted through the backing plate 58 of the door 24, and this inlet member can be connected to the flexible conduit 34 for admitting a pressurized gas into the interior of the hopper 14. A diffuser pad 76 is carried on the inside of the door plate 58, and is retained against the door by an annular mounting ring 78. Thus, when the door is swung open away from the mounting ring 56 the diffuser pad 76 is carried with the movement of the door so as to open the outlet 23 formed through the wall of the hopper 14. The diffuser pad provides for a spreading and diffusion of high pressure air across the inner surface of the door 24 and into the contents of the trailer when air is admitted through the inlets 74. The diffuser may be made of several layers of canvas or alternatively of a ceramic material which is permeable to a gas for admitting the same into the hopper 14.

FIGURE 6 also shows a gasket 80 which has been inserted between the inner surface of the diffuser pad 76 and a rim 82 around the second discharge outlet 23. This gasket is a solid disc like member made from rubber or other liquid proof materials, and the gasket is placed over the diffuser pad of the door only when liquids are to be carried within the trailer 10. The solid circular disc of gasket material effectively seals and protects the diffuser pad 76 from the liquid contents of the trailer bin. When dry materials are carried within the trailer, the gasket 80 is not placed over the diffuser pad, and the doors are thus in a condition to receive pressurized air through the inlets 74 for fluidizing the contents of each hopper. As seen in FIGURE 5, the first discharge outlet 20 is mounted in a position which is spaced from and on an opposite wall from the fluidizing means contained within the door 24. When pressurized air is admitted through the conduit 34 and the inlet 74, there is a fluidization and agitation of all pulverulent material contained within the bottom portion of the hopper 14. This fluidization and movement of the dry particle material accelerates the discharge of such material from the first discharge outlet 20.

When liquids are carried by the trailer, the gasket 80 is placed over each of the inner surfaces of the doors 24, as discussed above. When it is desired to discharge the liquid contents of the trailer through the first discharge outlets 20, the Y-shaped adapter 38 is connected to the high pressure line 31 at the coupling points 36. Then the single hose 42 of the adapter is coupled through the opening 44 at the top of the trailer tank, and air pressure is admitted to the tank interior and above the level of liquid contained therein. The valves 22 associated with each of the first discharge outlets 20 are open to release the liquid from the trailer bin, and liquid discharge takes place by gravity together with the force of air pressure being applied above the level of the liquid. The combined effect of the two forces is to accelerate the rate of discharge of liquid from the outlets 20 and ultimately through the dispensing pipe 32. Of course, the liquid discharge can take place by gravity alone and in this case no air pressure is added to the surface of the liquid but an opening is made at the top of the tank for admitting air into the tank to fill the space formerly occupied by liquid being discharged.

Having described the invention, it can be seen that there is provided a novel storage bin structure which can be easily adapted to a variety of storage requirements. The storage bin may be used for liquid materials as well as dry materials and the dry materials may be either pulverulent or non-pulverulent materials. The structure also provides for a rapid discharge of whatever material is contained within the bin, and provision has been made for fluidizing the contents, or alternatively, adding a fluid pressure to the upper interior of the storage bin for assisting in a dumping operation. The pneumatic discharge system associated with the storage bin is easily adapted to either liquid or dry pulverulent materials, and the pneumatic system includes a novel means for entraining the discharge materials with the same air flow which creates a pressure within the interior of the storage bin itself.

Although the invention has been described with reference to a single preferred embodiment, variations will become apparent to those skilled in the art. It is contemplated that the storage bin may be mobile in the form of a trailer, as illustrated, or it may be a stationary bin which incorporates the discharge system of this invention. Further changes will become apparent to those skilled in the art and such changes are intended to be included within the scope of this invention, as claimed.

What is claimed is.

1. Apparatus for transporting and discharging solid or liquid materials comprising:
    a mobile hopper for containing the material to be transported and discharged, said hopper having side walls and a bottom,
    a first discharge outlet leading from one side of the bottom of said hopper for conveying fluidized pulverulent materials and liquids out of the hopper, and valve means for opening and closing said first discharge outlet, a second discharge outlet on an opposed side of said hopper bottom for discharging non-pulverulent material by gravity, said second discharge outlet including a door means for opening and closing said second discharge outlet, and fluidizing means carried by said door means for admitting pressurized air into said hopper through said door means, whereby pulverulent material can be fluidized for discharging through said first discharge outlet when said apparatus is used for transporting and discharging pulverulent material.

2. The apparatus of claim 1 wherein said fluidizing means includes an air inlet orifice through said door means, said air inlet orifice communicating with an air diffusion means carried on an inner surface of said door means, whereby air under pressure can be admitted through said orifice and diffused into the contents of said hopper for fluidizing the same.

3. The apparatus of claim 1 and including means for producing a supply of pressurized air, and means for conveying said pressurized air into said hopper bottom through said fluidizing means.

4. The apparatus of claim 3 and including conduit means for diverting said pressurized air into the top of said hopper for discharging liquid from the hopper when the apparatus is used for transporting and discharging liquids.

5. The apparatus of claim 4 and including a sealing means for liquid-sealing said door means when said hopper is used for transporting and discharging liquids.

6. In container apparatus for storing solid or liquid materials and having discharge means for removing stored material from the apparatus, the improvement comprising:

a first discharge outlet in a bottom portion of said container apparatus for discharging fluidized pulverulent solid materials and liquids, and a valve means for opening and closing said first discharge outlet, a second discharge outlet in a bottom portion of said container and spaced from said first discharge outlet in an opposed relationship thereto, said second discharge outlet providing a means for discharging non-pulverulent solid material from said container, a door means associated with said second discharge outlet for opening and closing said second outlet, said door means further including an air inlet orifice for admitting pressurized air through said door and into said container apparatus when said door means is closed, whereby pulverulent material within the container apparatus can be fluidized and discharged from said first discharge outlet.

7. The improvement of claim 6 and including a pneumatic discharge system having means for producing a supply of pressurized air, and means for conveying said pressurized air into said container through the air inlet orifice of said door means for fluidizing pulverulent material within the container apparatus.

8. The improvement of claim 7 wherein said pneumatic discharge system further includes means for conveying a portion of said supply of pressurized air past said first discharge outlet for entraining material being discharged from said outlet, whereby the discharge rate of material is increased by such entraining action.

9. The improvement of claim 7 and including means for diverting said pressurized air into a top portion of said container apparatus for discharging liquid from the apparatus when the apparatus is used for storing liquids.

10. The improvement of claim 9 and including a sealing means for liquid-sealing said door means when said container is used for storing liquids.

References Cited by the Examiner

UNITED STATES PATENTS

| | | | |
|---|---|---|---|
| 2,435,832 | 2/1948 | Harvuot | 222—189 X |
| 3,246,805 | 4/1966 | Kemp | 222—195 |
| 3,269,428 | 8/1966 | Stockel et al. | 222—195 X |

ROBERT B. REEVES, *Primary Examiner.*

S. H. TOLLBERG, *Assistant Examiner.*